United States Patent
Tok et al.

(10) Patent No.: US 11,186,226 B2
(45) Date of Patent: Nov. 30, 2021

(54) RUNNING BOARD HAVING IMPROVED PERFORMANCE CHARACTERISTICS

(71) Applicant: Birinci Otomotiv Sanayi Ve Ticaret Anonim Sirketi, Cayirova/Kocaeli (TR)

(72) Inventors: Gorkem Tok, Cayirova/Kocaeli (TR); Serdar Macit, Cayirova/Kocaeli (TR)

(73) Assignee: BIRINCI OTOMOTIV SANAYI VE TICARET ANONIM SIRKETI, Carirova/Kocaeli (TR)

( * ) Notice: Subject to any disclaimer, the term of this patent is extended or adjusted under 35 U.S.C. 154(b) by 124 days.

(21) Appl. No.: 16/722,878

(22) Filed: Dec. 20, 2019

(65) Prior Publication Data
US 2021/0188178 A1 Jun. 24, 2021

(51) Int. Cl.
*B60R 3/02* (2006.01)
*B60R 3/00* (2006.01)

(52) U.S. Cl.
CPC ............... *B60R 3/02* (2013.01); *B60R 3/002* (2013.01); *B60Y 2400/412* (2013.01); *B60Y 2400/414* (2013.01)

(58) Field of Classification Search
CPC ..... B60R 3/02; B60R 3/002; B60Y 2400/412; B60Y 2400/414
See application file for complete search history.

(56) References Cited

U.S. PATENT DOCUMENTS

| 3,403,926 | A * | 10/1968 | Way | B60R 3/02 280/166 |
| 6,305,742 | B1 * | 10/2001 | Spendlove | A47C 4/24 297/16.1 |
| 7,377,531 | B2 * | 5/2008 | Fabiano | B60R 3/002 182/88 |
| 2003/0132595 | A1 * | 7/2003 | Fabiano | B60R 3/002 280/166 |
| 2017/0210299 | A1 * | 7/2017 | Watson | B60R 3/02 |

* cited by examiner

*Primary Examiner* — Bryan A Evans
(74) *Attorney, Agent, or Firm* — Ladas & Parry LLP (57) ABSTRACT

The present invention pertains to a running board system for vehicles, which comprises at least two drive groups at each side of the running board system and a driving member, where said driving member is fixed onto a drive flange such that rotational motion provided by said driving member is transferred through to a worm gear. Said running board system further comprises a bracket gear whereby movement is transferred from worm gear to bracket gear and a middle bracket centered to bracket gear. Said running board system further comprises a torque arm whereby movement from the side with driving member is transferred to the side without driving member in a synchronized manner and thereby running board is opened and closed parallel to vehicle, and the running board is driven parallel to the ground in a horizontal and vertical opening-closing motion.

13 Claims, 6 Drawing Sheets

RUNNING BOARD HAVING IMPROVED PERFORMANCE CHARACTERISTICS

FIELD OF THE PRESENT INVENTION

The present invention pertains to retractable running boards which typically enable getting in/out of a high ground clearance vehicle such as vans, buses, SUVs, pick-up trucks, public transportation vehicles and other passenger vehicles for transporting passengers and including but not limited to certain passenger cars.

BACKGROUND OF THE INVENTION

The invention particularly pertains to retractable running boards in vehicles with high ground clearance such as shuttle-like public transportation vehicles for transporting passengers; which remain unaffected by the roughness of the road surface owing to the horizontal movement thereof; which act/respond fast by performing a rotational movement; and which, at the same time, have a high load capacity.

There exist a large number of movable step-type configurations with various properties that allows operability of running boards so as to be differing in terms of working principles.

One of the prior art documents that can be referred to can be indicated as TR2010/01264, said disclosure allowing performance of oscillating movement in vertical axis. The downward oscillating movement performed during opening/closing of the step in such configurations increases the required workspace. This, in turn, is one of the disadvantages of these systems. This is because the step may get damaged or fail to function properly during opening/closing due to stones, bumps, etc. likely to hit the step.

Another prior art publication that can be considered relevant to the disclosure of the present invention can be referred to as WO 2019/053698, disclosing a deployable/retractable running board assembly for a motor vehicle including a running board, linkage coupled to the running board, and a motor assembly coupled to an actuator, the running board moveable between at least one stowed position and at least one deployed position. The linkage includes a drive arm connected to a pivot shaft within a housing at a location on the pivot shaft between two bushes that are coupled to the pivot shaft within the housing. The linkage also includes an idler arm connected to a pivot shaft within an idler housing. The actuator is operably coupled to the linkage to cause rotation of the linkage to move the running board between the at least one stowed position generally under the motor vehicle and at least one deployed position to provide a step surface for a user.

The mechanism of the present invention provides a torque arm connected to the two worm gears ensuring that the movement from the side with a driving member is transferred to the side without a driving member in a synchronized manner and thereby board is opened and closed parallel to vehicle. According to the present invention, movement is transferred from the side with a driving member via a torque arm connecting the two worm gears and rotating concentrically with said worm gears. A middle bracket centered and borne by centering shaft and bracket gear, moves concentrically and in sync with said bracket gear and transfers the movement to bottom bracket. The present invention's running board mechanism is particularly advantageous in that the drive groups are assembled to have an acute angle; therefore, during the 180° rotation of middle bracket as the running board opens and closes, board moves both horizontally and vertically.

The structural and characteristic features and all advantages of the invention will be understood more dearly by referring to the following figures and the detailed description written with reference to these figures; therefore, the figures and the detailed description should be taken into consideration while making an evaluation.

OBJECTS OF THE PRESENT INVENTION

One of the objects of the present invention is to provide a driving member that drives the running board of the invention parallel to the ground in a horizontal and vertical opening-closing motion.

Another object of the present invention is to provide a torque arm ensuring the movement from the side with a driving member is transferred to the side without a driving member in a synchronized manner and thereby board is opened and closed parallel to vehicle.

A further object of the present invention is to ensure that movement from the side with a driving member is transferred to the side without a driving member in a synchronized manner such that a torque arm connects the two worm gears rotates concentrically with said worm gears.

Still a further object of the present invention is to provide a stopper having one end covered by rubber and placed onto a top bracket whereby rotational movement provided by driving member is limited to 180° such that noise and impact are dampened.

Yet still further an object of the present invention is to provide a running board with a torque arm which is used to transfer movement from the side with a driving member to the side without driving member in the manner to be rotatable manually. Alternatively or additionally, the motor connection area of worm gear can be rotated by a rotating means, for example a key, in order to manually close the running board system.

Yet still further an object of the present invention is to provide a running board with a gear system comprising a worm gear and corresponding bracket gear are used in order to slow down the high speed rotation of driving member such that when worm gear completes one full rotation, bracket gear rotates at the rate of the gear ratio.

Yet still further an object of the present invention is to provide a running board moving up in the vertical direction when closing by which the running board system is protected from problems arising from irregularities of the road and also, the components of the system are protected from damages arising from dirt, mud and water on the roads. The rotation is transferred directly from the side with driving member to the side without driving member by torque arm in a synchronized manner so the movement of board is harmonious.

BRIEF DESCRIPTION OF THE FIGURES

Accompanying drawings are given solely for the purpose of exemplifying a running board in a vehicle, whose advantages over prior art were outlined above and will be explained in brief hereinafter.

The drawings are not meant to delimit the scope of protection as identified in the Claims, nor should they be referred to alone in an effort to interpret the scope identified in said claims without recourse to the technical disclosure in the description of the present invention.

The drawings are only exemplary in the sense that they do not necessarily reflect the actual dimensions and relative proportions of the respective components of the system if not otherwise explicitly stated.

DETAILED DESCRIPTION OF THE PRESENT INVENTION

The following numerals are assigned to different parts used in the detailed description:
1 First end cap
2 Board
3 Second end cap
4 Protective cover
6 Bracket gear
8 Drive flange
10 Stopper
12 Worm gear flange
13 Worm gear
16 Top bracket
17 Middle bracket
21 T-nut
23 First bolt
25 Torque arm
26 Driving member
27 Screw
28 Centering shaft
29 Cap gasket
30 Sliding bracket
31 Bottom bracket
32 Pin
33 Second bolt
34 Felt
36 Splint
37 O-ring
40 Sealing ring
41 Bush
42 Slotted coupling
43 Third bolt
50 Running board system

DETAILED DESCRIPTION OF THE PRESENT INVENTION

According to the present invention, the functioning of the mechanism of running board system (50) will be delineated hereinafter in reference to the appended figures.

In accordance with the main operating principle underlying the mechanism of the present invention, a driving member (26) drives the board (2) of the invention parallel to the ground in a horizontal opening-closing motion. Driving member (26) is fixed onto a drive flange (8). Said drive flange (8) provides bearing for said driving member (26).

Rotational motion provided by driving member (26) is transferred through drive flange (8) to worm gear (13) which is centered and borne by worm gear flange (12) and positioned in top bracket (16). Movement is transferred from worm gear (13) to bracket gear (6). Then movement is transferred from bracket gear (6) to middle bracket (17).

In order to protect bracket gear (6) and worm gear (13) from damage by water or dirt entering the system and rendering the mechanism non-operational, a protective cover (4) is secured onto top bracket (16).

Movement is transferred from middle bracket (17) to sliding bracket (30) which is centered by a centering shaft (28). Sliding bracket (30) is attached to bottom bracket (31) by at least one pin (32). The two drive groups arranged in this manner are fixed onto board (2) from bottom bracket (31) via T-nut (21).

Figure 1A:
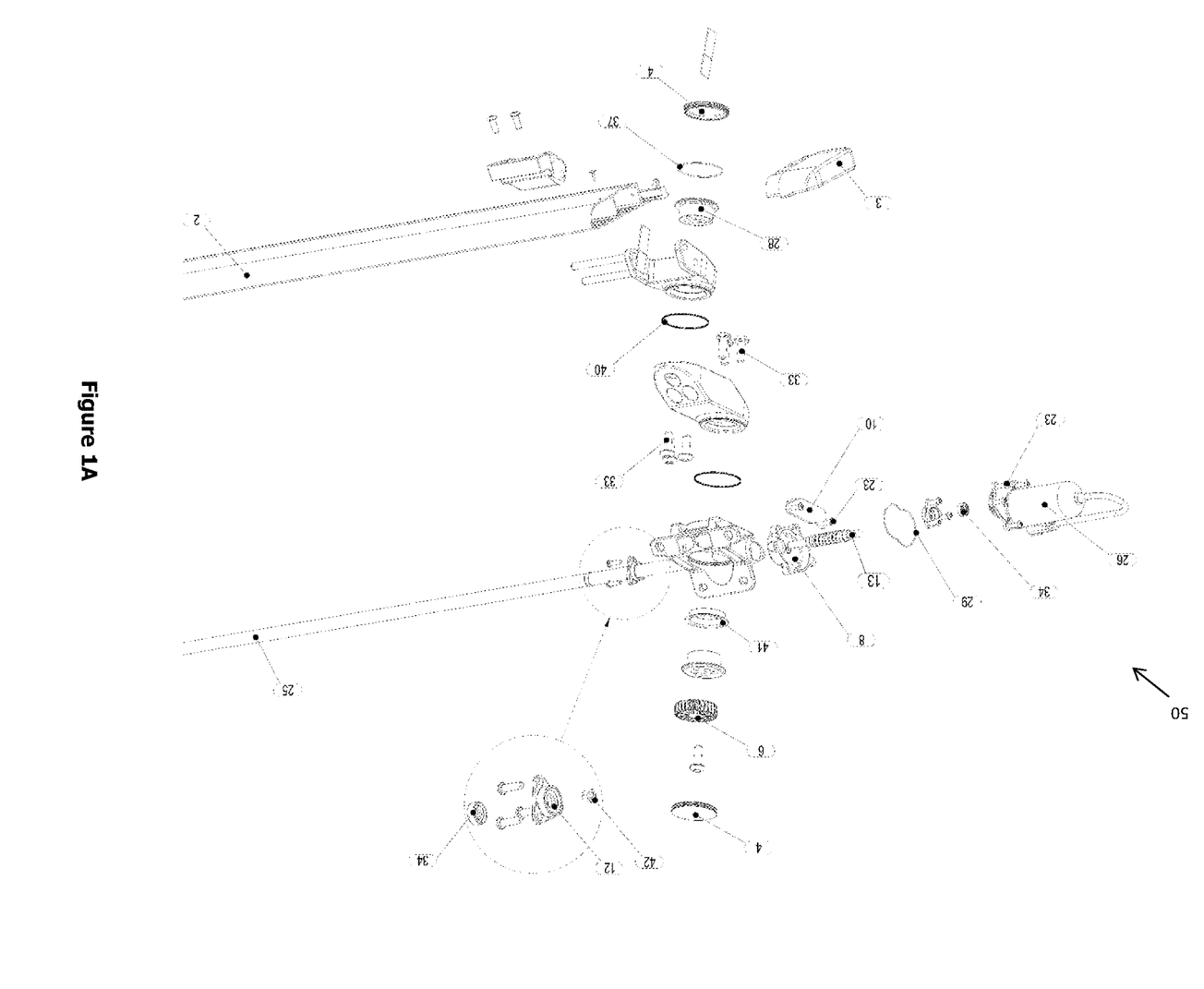
FIGS. 1A and 1B show a general exploded view of the components making up the two sides of a running board system according to the present invention.
Figure 1B:
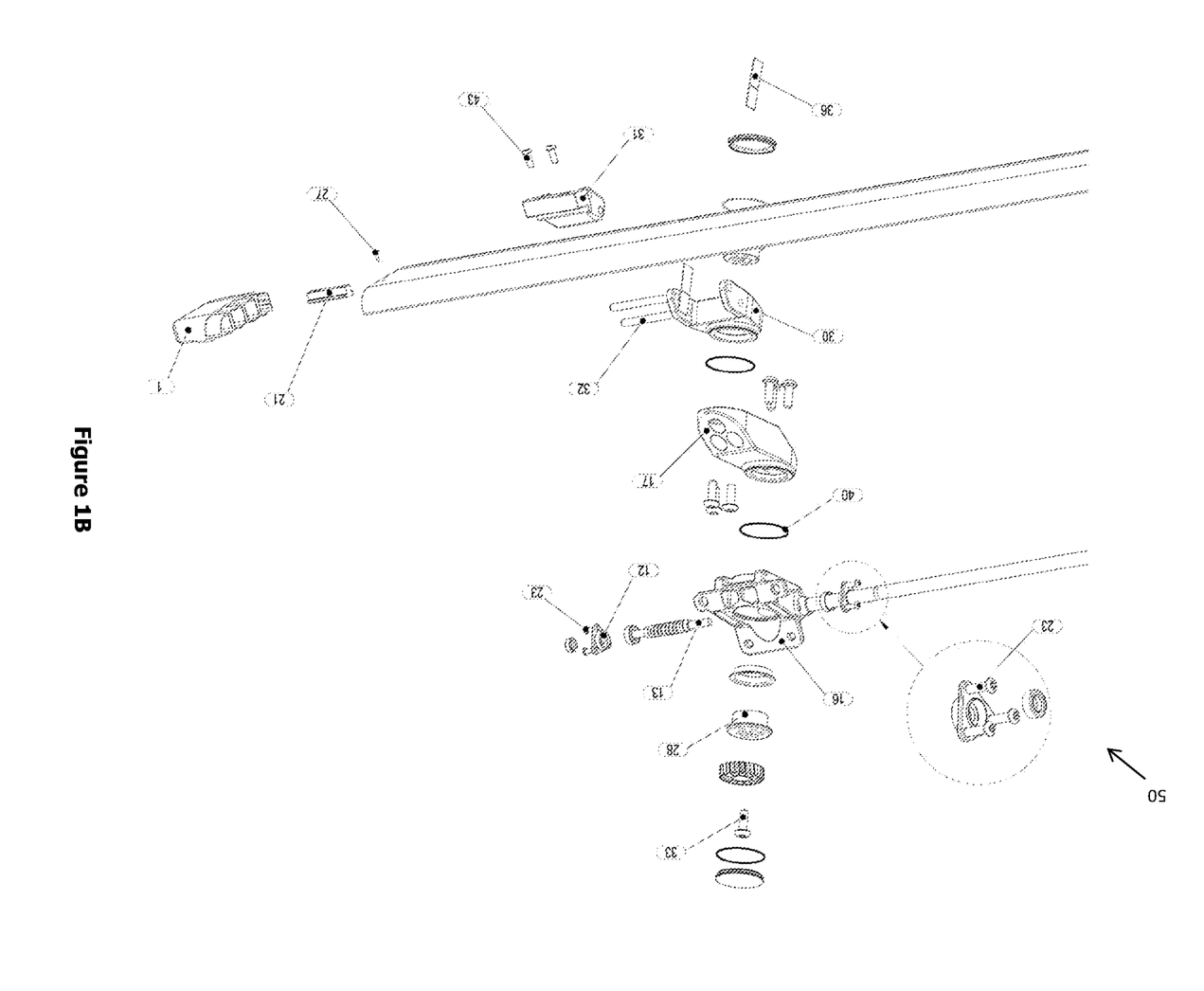
Figure 2:
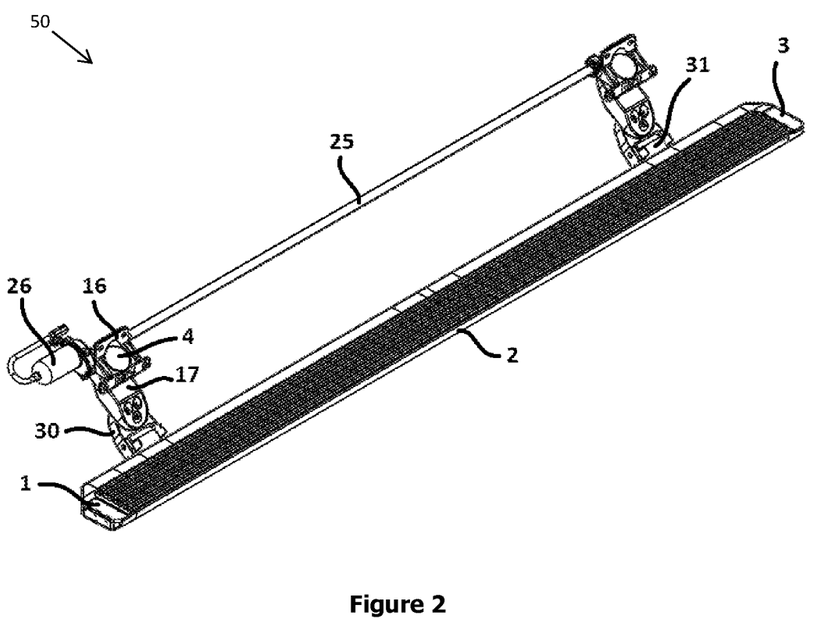
FIG. 2 demonstrates a perspective front view of the running board system according to the present invention.
Figure 3:
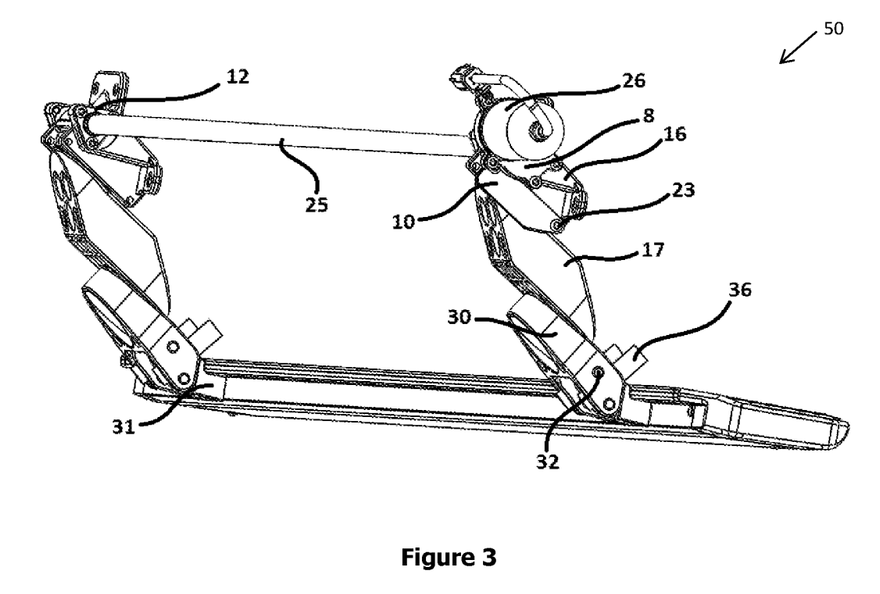
FIG. 3 demonstrates a perspective side view of the running board system according to the present invention.
Figure 4:
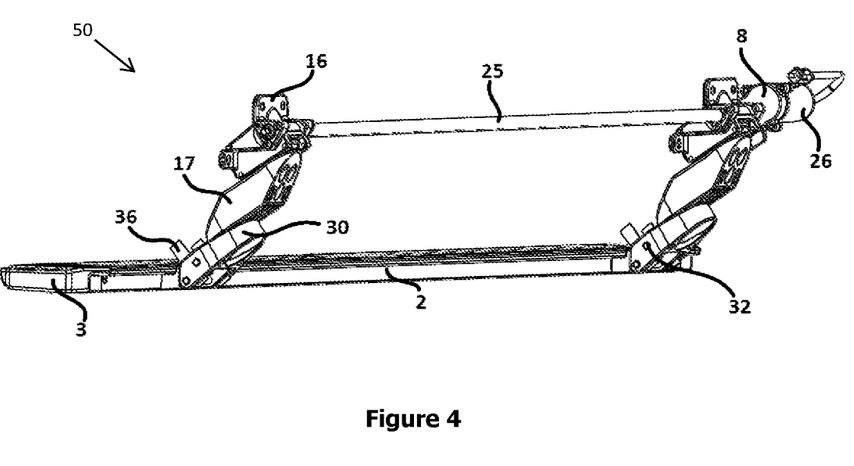
FIG. 4 demonstrates a perspective back view of the running board system according to the present invention.
Figure 5:
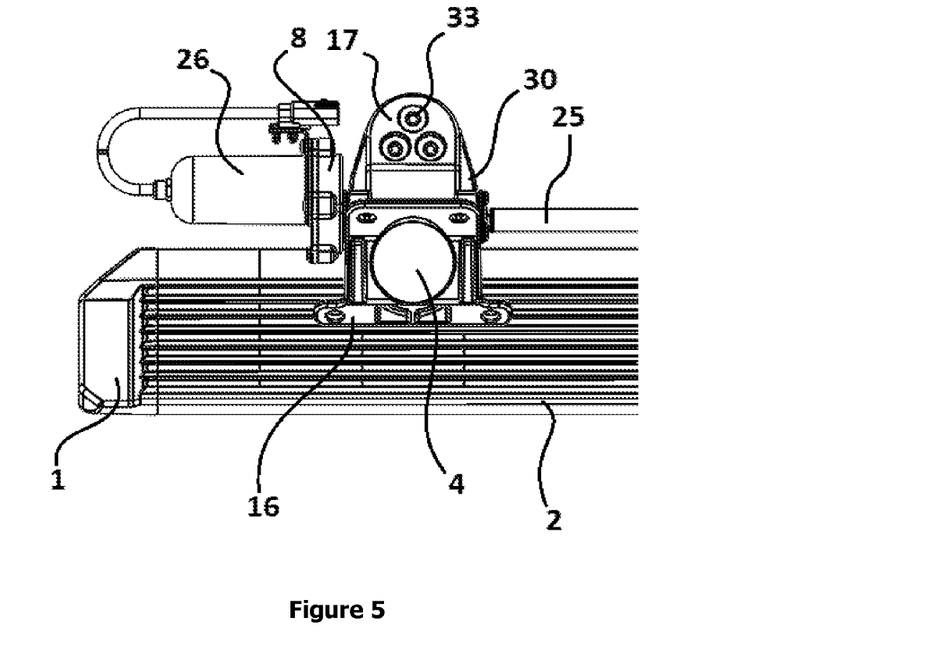
FIG. 5 demonstrates a top view of the running board system in a closed position according to the present invention.
Figure 6:
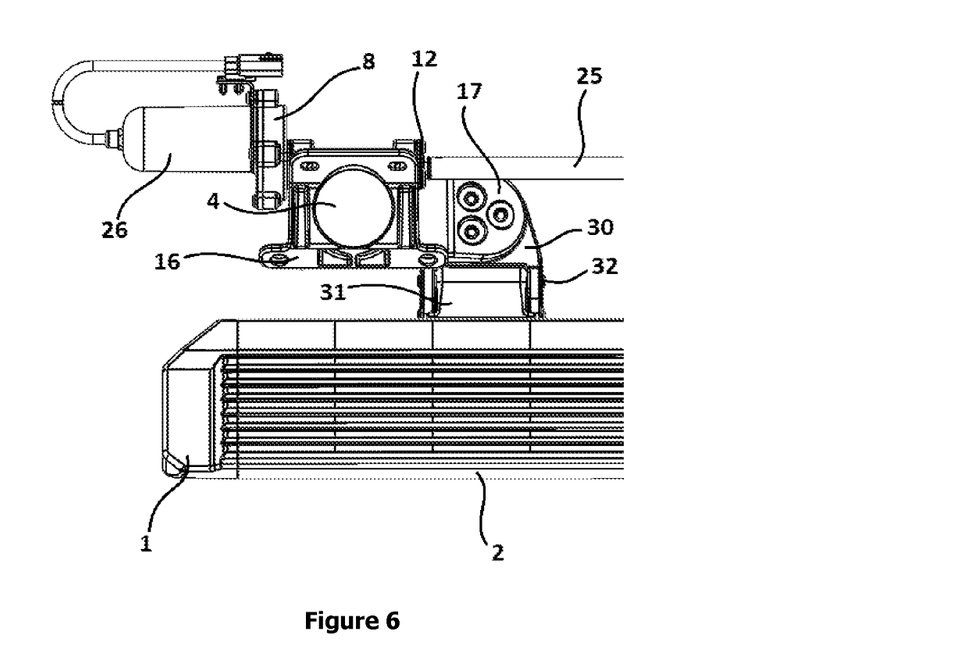
FIG. 6 demonstrates a top view of the running board system in a partly open position according to the present invention.
Figure 7:
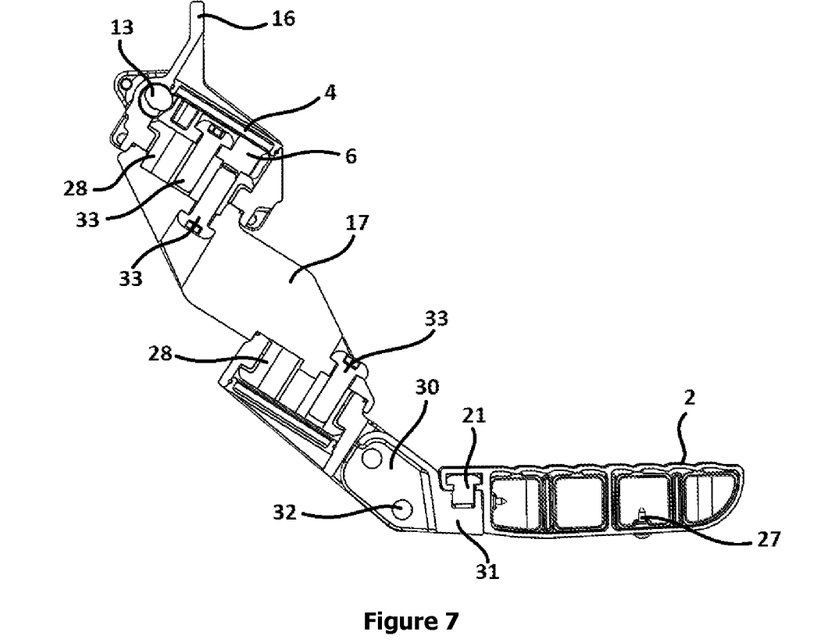
FIG. 7 demonstrates a side sectional view of the running board system according to the present invention.
Figure 8:
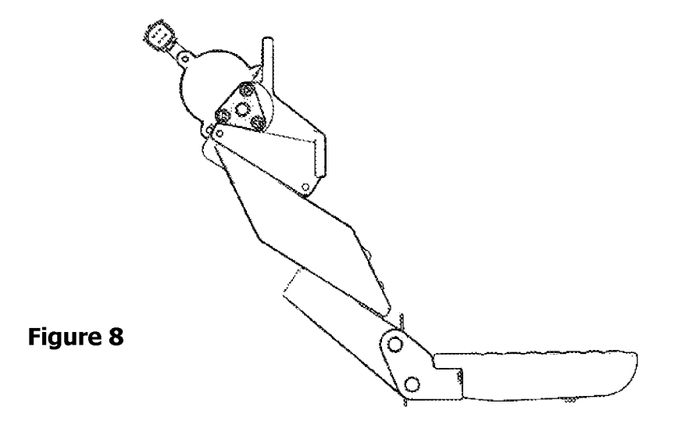
FIG. 8 demonstrates a side view of the running board system in an open position according to the present invention.
Figure 9:
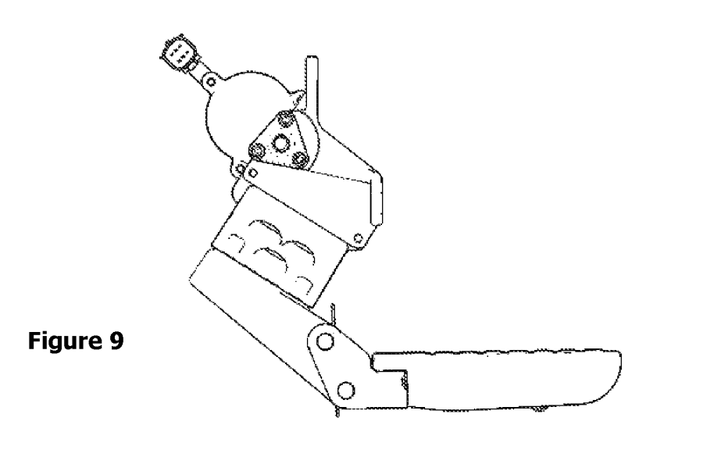
FIG. 9 demonstrates a side view of the running board system in a partly open position according to the present invention.
Figure 10:
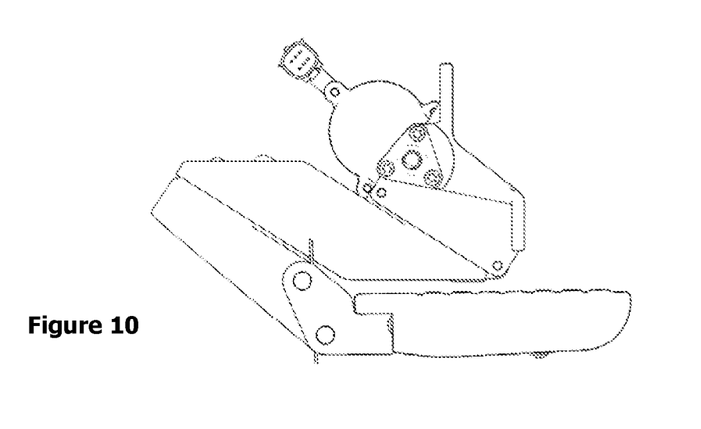
FIG. 10 demonstrates a side view of the running board system in a closed position according to the present invention.

A torque arm (25) connected to the two worm gears (13) by a slotted coupling (42) ensures the movement from the side with driving member (26) is transferred to the side without driving member (26) in a synchronized manner and thereby board (2) is opened and closed parallel to vehicle, as can be seen in FIGS. 8-10.

Because there is no driving member connected to the group on the side without driving member (26), movement is transferred from the side with driving member (26) via a torque arm (25) connecting the two worm gears (13) and rotating concentrically with said worm gears (13).

In order for board (2) to move from a closed position to an open position, middle bracket (17) rotates around 180°, providing access to the side entry of the vehicle. In order for the rotational movement provided by driving member (26) to be limited to 180°, a stopper (10) having one end covered by rubber is placed onto top bracket (16) to dampen the noise and the impact. When board (2) reaches the desired position during the opening and closing of the running board, the side surface of middle bracket (17) comes into contact with stopper (10) and terminates the movement. At this stage, the electronic module in the vehicle confirms that the running board is open or closed using the information received from driving member (26) and ensures that the running board system operates in an integrated manner with the vehicle.

According to the present invention, two end caps (1, 3) are fixed on either side of board (2).

When the start signal from the electronic module reaches the running board system, driving member (26) starts its operation. The movement produced by driving member (26) drives said worm gear (13). Middle bracket (17) centered and borne by bracket gear (6), moves concentrically and in sync with said bracket gear (6) and transfers the movement to sliding bracket (30). The rotation of middle bracket (17) is transferred via sliding bracket (30), which is centered and borne by centering shaft (28), to bottom bracket (31) and to board (2), which is fixed thereto by a T-nut (21). The drive groups are assembled to have an angle less than 90°, particularly between 25° and 35° and more particularly around 30°∓2° with respect to the board surface; therefore, during the rotation of middle bracket (17) as the running board system (50) opens and closes, board (2) moves both horizontally and vertically. This angle can be changed in order to adjust how far away from the vehicle board (2) will move in the fully open position.

The 180° rotation movement of middle bracket (17) is limited by stopper (10) in the fully open and fully closed positions of board (2), therefore there is no need for driving member (26) to be locked in order to limit the movement. In addition, the 180° rotation movement of middle bracket (17) allows said middle bracket (17) to be smaller and therefore running board system (50) of the invention has an advantageous compact structure in the closed position while providing a suitable distance in the open position. This allows said running board system (50) to be mounted onto the vehicle more easily and protects said running board system (50).

In case the vehicle cannot provide power to driving member (26), torque arm (25) which is used to transfer movement from the side with driving member (26) to the side without driving member (26) can be rotated manually or the motor connection area of worm gear (13) can be rotated by a rotating means, for example a key, in order to manually close the running board system.

A gear system comprising a worm gear (13) and corresponding bracket gear (6) are used in order to slow down the high speed rotation of driving member (26). When worm gear (13) completes one full rotation, bracket gear (6) rotates at the rate of the gear ratio. In response, when bracket gear (6) completes one half rotation, middle bracket (17) rotates 180° and board (2) moves from closed position to open position. When bracket gear (6) completes one half rotation, worm gear (13) rotates at a rate depending on the gear ratio.

Because board (2) also moves up in the vertical direction when the running board system is closing, the running board system is protected from problems arising from irregularities of the road and also, the components of the system are protected from damages arising from dirt mud and water on the roads. The rotation is transferred directly from the side with driving member (26) to the side without driving member (26) by torque arm (25) in a synchronized manner so the movement of board (2) is harmonious.

In a nutshell, the invention proposes a running board system (50) for vehicles, said running board system comprising a board (2) two drive groups at each side of the running board system (50) and a driving member (26).

In an aspect of the invention, said driving member (26) is fixed onto a drive flange (8) such that rotational motion provided by said driving member (26) is transferred through to a worm gear (13).

In an aspect of the invention, said running board system (50) further comprising a bracket gear (6) such that movement is transferred from said worm gear (13) to said bracket gear (6).

In an aspect of the invention, said running board system (50) further comprising a middle bracket (17) centered to bracket gear (6).

In an aspect of the invention, said running board system (50) further comprising a torque arm (25) in connection to two worm gears (13) at each side of the running board system such that movement from the side with driving member (26) is transferred to the side without driving member (26) in a synchronized manner and thereby said board (2) Is opened and closed parallel to vehicle.

In an aspect of the invention, said board (2) is driven parallel to the ground in a horizontal and vertical opening-closing motion.

In an aspect of the invention, said running board system comprises a protective cover (4) secured onto said top bracket (16) whereby said bracket gear (6) and worm gear (13) are protected against damage by water or dirt entering the system and rendering the mechanism non-operational.

In an aspect of the invention, said running board system further comprises a sliding bracket (30) centered by a centering shaft (28) such that movement is transferred from middle bracket (17) to said sliding bracket (30).

In an aspect of the invention, said two drive groups arranged in this manner are fixed onto board (2) from said sliding bracket (30) via a bottom bracket (31).

In an aspect of the invention, said torque arm (25) rotates concentrically with said worm gears (13).

In an aspect of the invention, said middle bracket (17) is configured to rotate around at least 180°.

In an aspect of the invention, a stopper (10) is placed onto said top bracket (16) such that side surface of middle bracket (17) comes into contact with said stopper (10) and terminates the movement to dampen the noise and the impact.

In an aspect of the invention, said drive groups are configured to have an angle less than 90°, particularly between 25° and 35° and more particularly around 30°∓2° with respect to the board surface.

In an aspect of the invention, said torque arm (25) is manually rotatable or the motor connection area of worm gear (13) is rotatable by a rotating means.

In an aspect of the invention, gear system comprising said worm gear (13) and corresponding bracket gear (6) are configured to slow down the high speed rotation of driving member (26) such that when worm gear (13) completes one full rotation, bracket gear (6) rotates at the rate of the gear ratio.

In an aspect of the invention, bracket gear (6) completes one half rotation, middle bracket (17) rotates 180° and board (2) moves from closed position to open position.

In an aspect of the invention, bracket gear (6) completes one half rotation, worm gear (13) rotates at a rate depending on the gear ratio.

The invention claimed is:

1. A running board system for a vehicle, said running board system comprising a board, two drive groups disposed at first and second sides of the running board system respectively, first and second worm gears disposed at the first and second sides of the running board system respectively, and a driving member,
    said driving member being fixed onto a drive flange such that rotational motion provided by said driving member is transferred through to the first worm gear,
    said running board system further comprising a bracket gear such that movement is transferred from said first worm gear to said bracket gear,
said running board system further comprising a middle bracket centered to the bracket gear, said middle bracket being configured to rotate around at least 180°,
    said running board system further comprising a torque arm in connection to the first and second worm gears at each side of the running board system such that movement from the side with the driving member is transferred to the side without the driving member in a synchronized manner and thereby said board is opened and closed parallel to the vehicle,
    whereby said board is driven parallel to the ground in a horizontal and vertical opening-closing motion.

2. The running board system as set forth in claim 1, wherein said running board system comprises a top bracket and a protective cover secured onto said top bracket whereby said bracket gear and worm gear are protected against damage by water or dirt entering the running board system and rendering a mechanism of the running board system non-operational.

3. The running board system as set forth in claim 1, wherein said running board system further comprises a sliding bracket centered by a centering shaft such that movement is transferred from the middle bracket to said sliding bracket.

4. The running board system as set forth in claim 3, wherein said two drive groups are fixed onto the board from said sliding bracket via a bottom bracket.

5. The running board system as set forth in claim 1, wherein said torque arm rotates concentrically with said first and second worm gears.

6. The running board system as set forth in claim 2, wherein a stopper is disposed on said top bracket such that a side surface of the middle bracket can contact said stopper to terminate movement of the middle bracket whereby to dampen noise and impact.

7. The running board system as set forth in claim 1, wherein said two drive groups are configured to have an angle that is less than 90° with respect to a surface of the board.

8. The running board system as set forth in claim 1, wherein said torque arm is manually rotatable.

9. The running board system as set forth in claim 1, wherein the first worm gear and the bracket gear are configured to slow down a rotation speed of the driving member such that when the first worm gear completes one full rotation, the bracket gear rotates at a rate of a gear ratio between the first worm gear and the bracket gear.

10. The running board system as set forth in claim 9, wherein, when the bracket gear completes one half rotation, the middle bracket rotates 180° and the board moves from a closed position to an open position.

11. The running board system as set forth in claim 10, wherein, when the bracket gear completes one half rotation, the first worm gear rotates at a rate that is dependent on a gear ratio between the first worm gear and the bracket gear.

12. The running board system as set forth in claim 1, comprising rotating means for rotating said torque arm.

13. The running board system as set forth in claim 1, wherein said two drive groups are configured to have an angle that is between 25° and 35° with respect to a surface of the board.

* * * * *